(12) United States Patent
Van Stalen et al.

(10) Patent No.: US 6,967,975 B2
(45) Date of Patent: Nov. 22, 2005

(54) SYSTEM AND METHOD FOR TIME-DOMAIN MULTIPLEXED COMMUNICATION IN ULTRASOUND APPLICATIONS

(75) Inventors: Nick Andrew Van Stalen, Ballston Lake, NY (US); Vikram Bidare Krishnamurthy, Atlanta, GA (US); John Anderson Fergus Ross, Del Mar, CA (US)

(73) Assignee: General Electric Company, Niskayuna, NY (US)

( * ) Notice: Subject to any disclaimer, the term of this patent is extended or adjusted under 35 U.S.C. 154(b) by 972 days.

(21) Appl. No.: 09/681,617

(22) Filed: May 9, 2001

(65) Prior Publication Data

US 2002/0167971 A1 Nov. 14, 2002

(51) Int. Cl.[7] .................................................. H04J 3/02
(52) U.S. Cl. ....................................... 370/535; 600/437
(58) Field of Search .............................. 600/407, 437, 600/443, 459, 463; 370/464, 498, 532, 534, 370/535, 537, 542

(56) References Cited

U.S. PATENT DOCUMENTS

| | | | |
|---|---|---|---|
| 5,566,133 A | | 10/1996 | Engeler et al. |
| 5,622,177 A | * | 4/1997 | Breimesser et al. ........ 600/459 |
| 6,142,946 A | * | 11/2000 | Hwang et al. ............... 600/459 |
| 6,506,160 B1 | * | 1/2003 | Van Stralen et al. ........ 600/459 |

* cited by examiner

*Primary Examiner*—Ricky Ngo
*Assistant Examiner*—Derrick W Ferris
(74) *Attorney, Agent, or Firm*—Fletcher Yoder

(57) ABSTRACT

A time-domain communication system in an ultrasonic imaging system includes an ultrasonic probe having an ultrasonic array with ultrasonic array outputs and a time-domain multiplexer with an input connected to each of the ultrasonic array outputs and also having a multiplexer output. The time-domain multiplexer continually cycles through each of the ultrasonic array outputs at a predetermined frequency connecting each of the ultrasonic array outputs to the multiplexer output for a predetermined amount of time. An ultrasonic data processing unit is provided and includes a de-multiplexer connected to the multiplexer output. The de-multiplexer has de-multiplexer outputs and continually cycles through each of the de-multiplexer outputs at the predetermined frequency connecting each of the de-multiplexer outputs to the multiplexer output for the predetermined amount of time. A timing reference is connected to the time-domain multiplexer and the de-multiplexer for providing a single timing reference to determine at least the predetermined frequency.

24 Claims, 4 Drawing Sheets

SYSTEM AND METHOD FOR TIME-DOMAIN MULTIPLEXED COMMUNICATION IN ULTRASOUND APPLICATIONS

BACKGROUND OF INVENTION

The present invention relates to electronic communication in an ultrasonic system and, more particularly, to a system and method for time domain multiplexed communication in an ultrasonic imaging system.

Typically, ultrasonic imaging systems include an ultrasonic probe with an ultrasonic array having a plurality of ultrasonic elements. With some of these ultrasonic imaging systems, such as, for example, 2-D and 3-D reconstruction systems, the number of ultrasonic elements becomes relatively high. Typically, a separate co-axial cable for each ultrasonic element is used to transmit ultrasonic data that is obtained from the ultrasonic element to various ultrasonic data processing electronics. For ultrasonic imaging systems having a high number of ultrasonic element, such as, for example, 2-D and/or 3-D reconstruction systems, the number of co-axial cables can be over 500 cables. As such, cable bundles connecting the probe to the various ultrasonic data processing electronics can include over 500 individual co-axial cables. Cable bundles housing over 500 individual co-axial cables are stiff and difficult to manipulate. In other ultrasonic imaging systems that have less ultrasonic elements, the cable bundles house about 128 co-axial cables. These cable bundles having about 128 co-axial cables have been found to be more flexible and easier to manipulate. Therefore, in ultrasonic systems with a large number of cables, there is a desire to reduce the number of cables and/or the size of the cable bundle connecting the ultrasonic probe to the ultrasonic data processing electronics such that the ultrasonic probe can be easier to manipulate during ultrasonic imaging procedures.

In a prior system used to reduce the number of cables or the size of the cable bundle, fiber optic cables are used to replace the co-axial cables because fiber optic cables are more flexible than co-axial cables. However, the ultrasonic system using fiber optic cables requires digital optical modulation that uses a time gain control (TGC) amplifier and an analog to digital (A/D) converter for each ultrasonic element in the ultrasonic array. As such, in ultrasonic systems where the ultrasonic array has over 500 ultrasonic elements, these fiber optic systems are expensive and have high energy consumption.

In another prior system, the number of cable bundles is reduced using frequency domain multiplexing. In these systems, a frequency domain multiplexer is connected to the ultrasonic array and connects the number of cables from the ultrasonic array to a lesser number of cables in an output to the frequency domain multiplexer. The switching between the cables of the ultrasonic array was based on frequency domain criteria. However, since the ultrasonic signals are typically analog signals, the frequency domain multiplexed systems can only combine a relatively small number of signals using a frequency domain multiplexer. As such, the number of cables and/or the size of the cable bundles is not reduce to a number that make the ultrasonic probe easier to use and manipulate during ultrasonic imaging procedures. As such, there is a desire to produce an ultrasonic imaging system and method that reduces the number of cables or the size of the cable bundle connecting the ultrasonic probe to the ultrasonic data processing electronics. In addition, there is a desire for a system and method that reduces the number of cables and/or the size of the cable bundle without the above-identified limitations and without increased costs of operation of the ultrasonic imaging system.

SUMMARY OF INVENTION

In one exemplary embodiment, a time-domain communication system for use in an ultrasonic imaging system is provided that comprises an ultrasonic array having a plurality of ultrasonic array outputs. A time-domain multiplexer is included and has an input connected to each of the plurality of ultrasonic array outputs. The time-domain multiplexer also has a multiplexer output. In addition, the time-domain multiplexer continually cycles through each of the plurality of ultrasonic array outputs at a predetermined frequency, and each of the plurality of ultrasonic array outputs are connected to the multiplexer output for a predetermined amount of time. The plurality of ultrasonic array outputs comprises a first number of outputs, and the multiplexer output comprises a second number of outputs. The first number of outputs is greater than the second number of outputs. A de-multiplexer has an input that is connected to the multiplexer output. The de-multiplexer has a plurality of de-multiplexer outputs, and the de-multiplexer continually cycles through each of the de-multiplexer outputs at the predetermined frequency wherein each of the de-multiplexer outputs is connected to the multiplexer output for the predetermined amount of time. The plurality of de-multiplexer outputs comprises a third number of outputs, and the third number of outputs is greater than the second number of outputs. A time gain control amplifier is connected to each of the plurality of de-multiplexer outputs and amplifies each respective signal in each of the plurality of de-multiplexer outputs. An analog to digital converter is connected to the time gain control amplifier, and each respective signal in each of the plurality of de-multiplexer outputs is converted to a digital signal at a sample frequency rate. A timing reference is connected to the time-domain multiplexer, the de-multiplexer and the analog to digital converter. The timing reference provides a single timing reference to determine at least the predetermined frequency and the sample frequency rate.

In another exemplary embodiment, a method for time-domain communication in an ultrasonic imaging system comprises acquiring ultrasonic data from an ultrasonic array. The ultrasonic data is transmitted via a plurality ultrasonic array outputs to a time-domain multiplexer having an input connected to each of the plurality of ultrasonic array outputs. The plurality of ultrasonic array outputs comprising a first number of outputs. Each of the plurality of ultrasonic array outputs is continually cycled through at a predetermined frequency to connect and transmit the ultrasonic data from the plurality of ultrasonic array outputs to at least one multiplexer output for a predetermined amount of time. The at least one multiplexer output has a second number of outputs wherein the first number of outputs is greater a second number of outputs. Also, the at least one multiplexer output is connected to a de-multiplexer having a plurality of de-multiplexer outputs. The plurality of de-multiplexer outputs comprising a third number of outputs wherein the third number of outputs is greater than the second number of outputs. Additionally, the plurality of de-multiplexer outputs is continually cycled through at the predetermined frequency to connect each of the plurality of de-multiplexer outputs to the at least one multiplexer output and to transmit the ultrasonic data from the multiplexer output to the plurality of de-multiplexer outputs. The ultrasonic data in the plurality of de-multiplexer outputs is amplified. The ultrasonic data is converted to digital ultrasonic data at a sampling frequency rate. An ultrasonic image is created from the digital ultrasonic signal.

DETAILED DESCRIPTION

Figure 1:
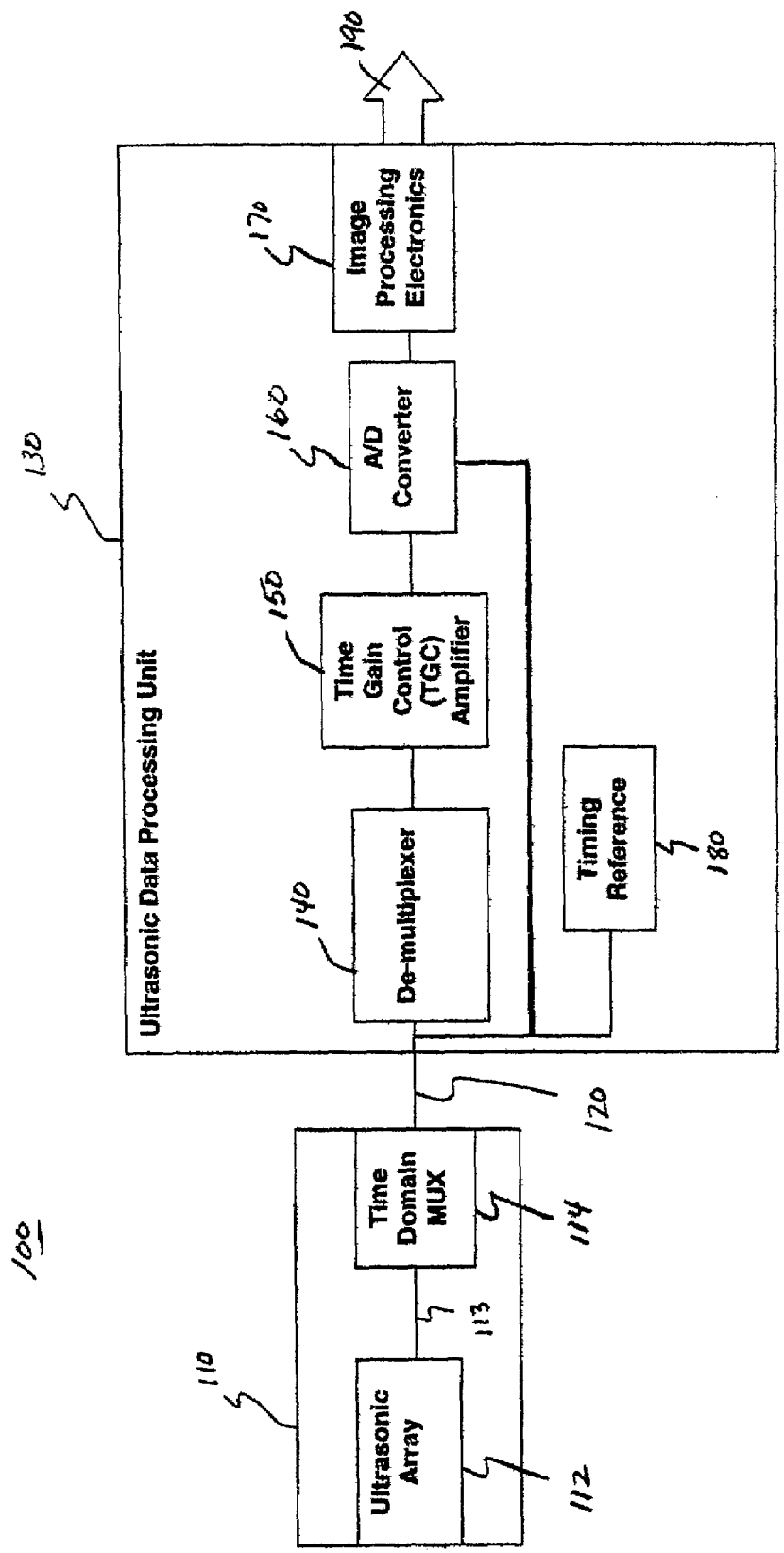
FIG. 1 is a block diagram view of one exemplary embodiment of an ultrasonic imaging system.

In one embodiment as shown in FIG. 1, an ultrasonic imaging system 100 comprises an ultrasonic probe 110 connected to an ultrasonic data processing unit 130. The ultrasonic probe 110 includes a time-domain multiplexer 114 that is connected to ultrasonic array 112 via an array connector 113 wherein the array connector 113 has a first number of outputs. The time-domain multiplexer 114 is also connected to the ultrasonic data processing unit 130 via probe connector 120 wherein the probe connector 120 has a second number of outputs. The first number of outputs in the array connector 113 is greater than the second number of outputs in the probe connector 120 such that the ultrasonic probe 110 can be more easily handled and/or maneuvered during various ultrasonic imaging procedures. In another embodiment, the ultrasonic array 112 is connected to a plurality of cable bundles where each of the plurality of cable bundles includes at least one of the array connectors 113.

As shown in FIG. 1, one representative embodiment of the ultrasonic imaging system 100 includes ultrasonic probe 110 connected to ultrasonic data processing unit 130 via probe connector 120. In one embodiment, the ultrasonic imaging system 100 produces medical ultrasonic images used in diagnosis, treatment or evaluation of a patient. It should be appreciated that, in one embodiment, the ultrasonic imaging system 100 can be used in two-dimensional (2-D) and three-dimensional (3-D) reconstruction imaging systems. It should also be appreciated that, in other embodiments, the ultrasonic imaging system 100 can be used for applications other than medical imaging.

In one embodiment, as shown in FIG. 1, the ultrasonic probe 110 comprises an ultrasonic array 112 that comprises a plurality of ultrasonic transducers (not shown) and at least one ultrasonic source (not shown). During operation, the ultrasonic source (not shown) transmits an ultrasonic frequency and the ultrasonic transducers (not shown) sense the reflected ultrasonic frequency and produce an electronic signal in response thereof. The electrical signals that are produced by the ultrasonic transducers (not shown) of the ultrasonic array 112 are provided to the time-domain multiplexer 114 via array connector 113 having a plurality of outputs wherein the plurality of outputs comprises a first number of outputs. In one embodiment the outputs in the array connector comprise co-axial cables. It should be appreciated that in ultrasonic imaging systems 100 using, such as, for example, 2-D or 3-D reconstruction imaging systems, the number of outputs in the array connector 113 can comprise over five hundred (500) outputs. It should be appreciated that, in another embodiment, the array connector 113 can comprise a plurality of co-axial cables, and each of the co-axial cables is coupled a predetermined number of channels where each channel is connected to a predetermined number of ultrasonic array outputs 210 (FIG. 2) of the ultrasonic array 112. In addition, in this embodiment, the time-domain multiplexer 114 can comprises a plurality of time-domain multiplexers 114 wherein each of the co-axial cables is connected to a different time-domain multiplexer 114 wherein the outputs of the plurality of time-domain multiplexers 114 are included in the probe connector 120.

As shown in FIG. 1, the probe connector 120 connects the time-domain multiplexer 114 to the ultrasonic data processing unit 130. In one embodiment, the probe connector 120 includes a plurality of outputs, such as, for example, each output from the plurality of time-domain multiplexers 114. In one embodiment, the each of the plurality of outputs in the probe connector 120 comprises co-axial cables. It should be appreciated that the plurality of outputs in the probe connector 120 comprises a second number of outputs wherein the first number of outputs in the array connector 113 is greater than the second number of outputs in the probe connector 120. In one embodiment, the number of outputs in the probe connector 120 is about one hundred twenty-five (125) outputs. The difference in the first number of outputs in the array connector 113 and the second number of outputs in the probe connector 120 allows the probe connector 120 to be thinner and more flexible, and, therefore, the ultrasonic probe 110 can more easily be manipulated during various ultrasonic imaging procedures.

In one embodiment as shown in FIG. 1, the ultrasonic data processing unit 130 is connected to the ultrasonic probe 110 via the probe connector 120. A de-multiplexer 140 is connected to the probe connector 120. A time gain control (TGC) amplifier 150 is connected to the de-multiplexer 140. An analog to digital (A/D) converter 160 is connected to the TGC amplifier 150. Image processing electronics 170 are connected to the A/D converter 160, and the image processing electronics 170 have a processing unit output 190 that is connected to other devices (not shown). A timing reference 180 is connected to the de-multiplexer 140 and A/D converter 160, and, in addition, the timing reference 180 is connected to the time-domain multiplexer 114 via the probe connector 120.

Figure 2:
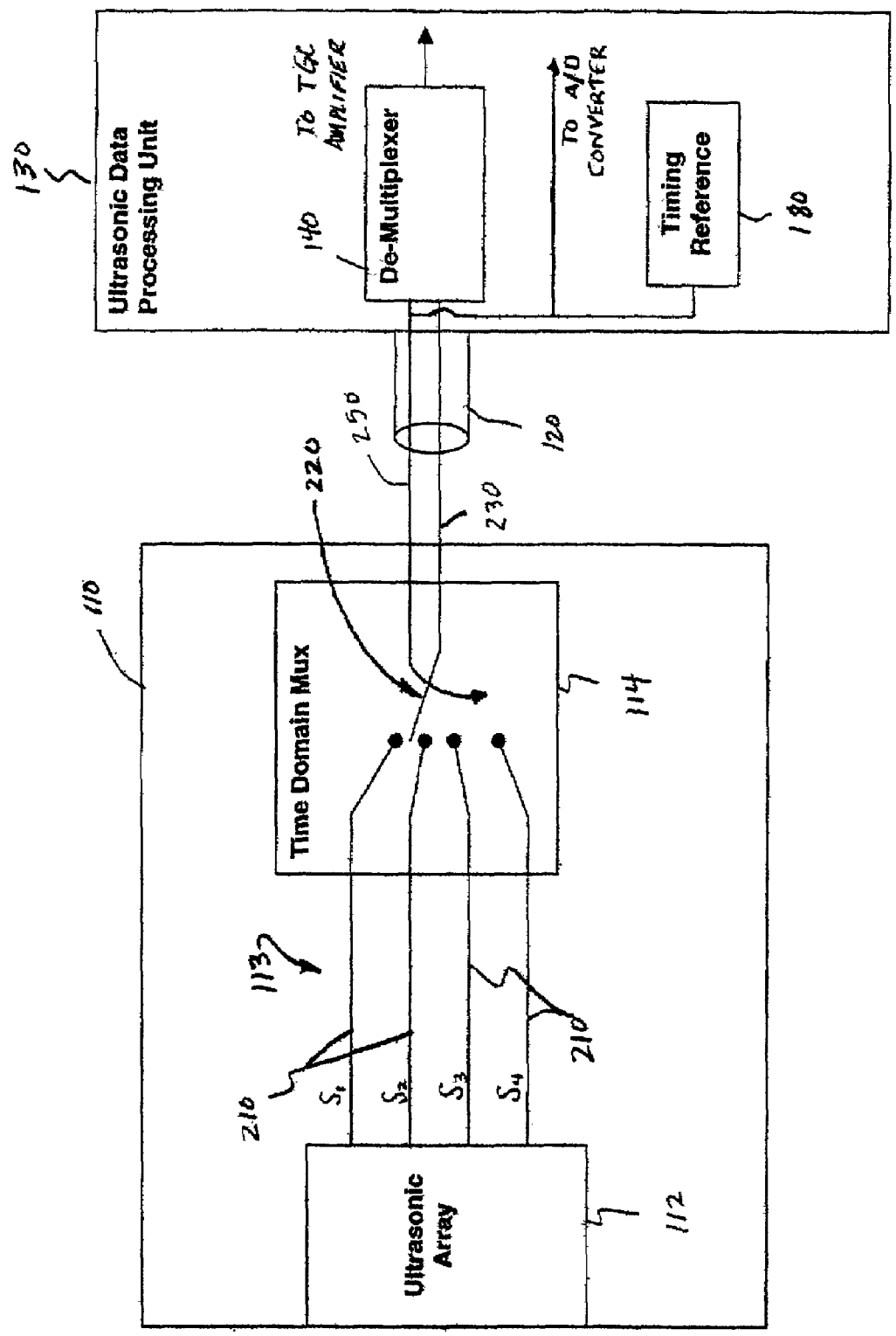
FIG. 2 is a block diagram view of one exemplary embodiment of a time-domain multiplexer used in an ultrasonic probe.
Figure 3:
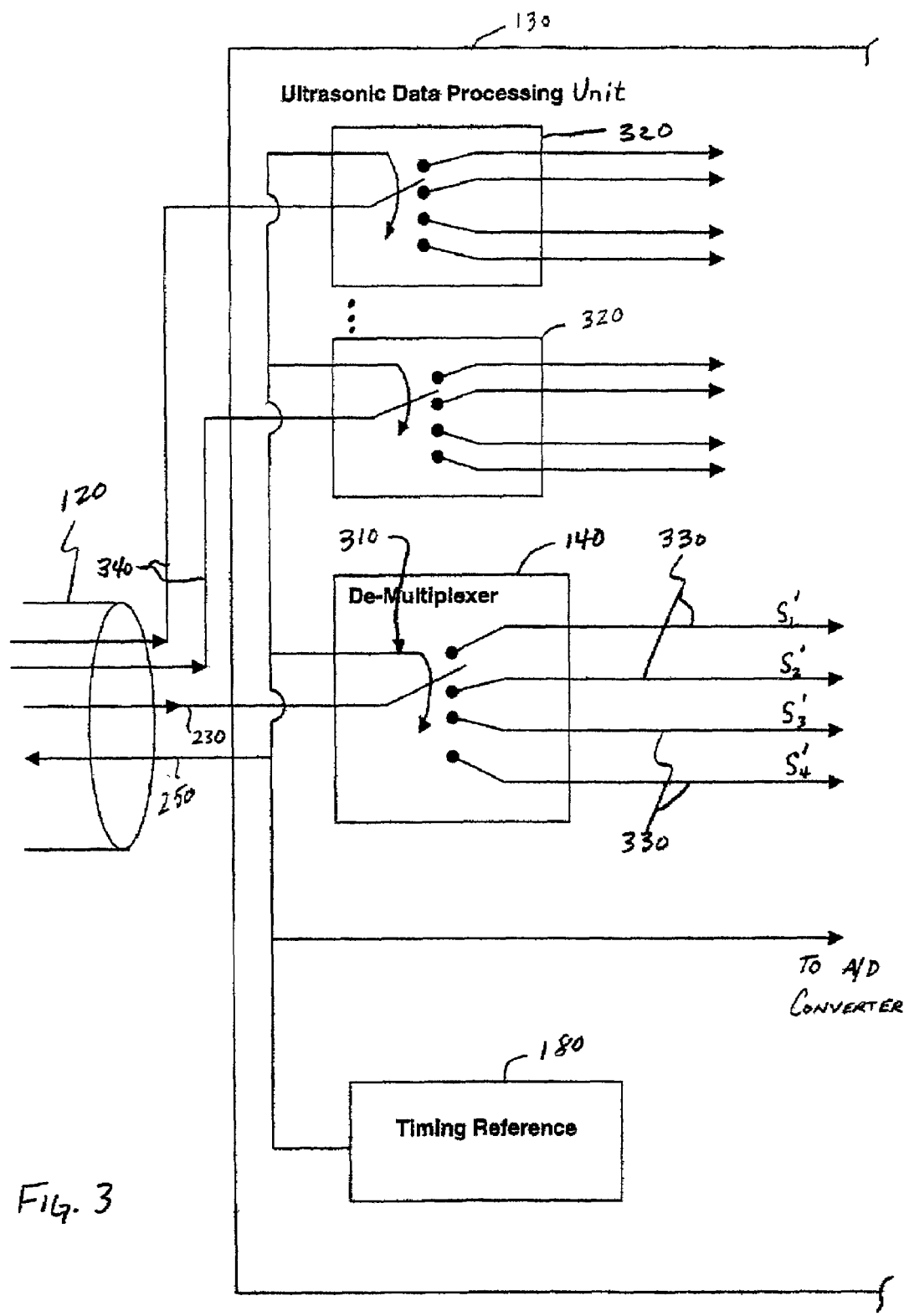
FIG. 3 is a block diagram view of one exemplary embodiment of an ultrasonic data processing unit.

As shown in FIG. 2, the ultrasonic array 112 includes a plurality of ultrasonic array outputs 210. As described hereinabove, the ultrasonic array outputs 210 transmit ultrasonic data (S1–S4) from the ultrasonic array 112. The ultrasonic array outputs 210 are connected to the time-domain multiplexer 114 that includes a multiplexer switching element 220 that is connected to the timing reference 180. The multiplexer switching element 220 continually cycles through the ultrasonic array outputs 210 at a predetermined frequency to connect each of the ultrasonic array outputs 210 to the multiplexer output 230 for a predetermined amount of time. In one embodiment, the predetermined frequency is equal to the sample rate of the A/D converter 160 multiplied by the number of outputs in the ultrasonic cable array 210. In one embodiment as shown in FIGS. 2 and 3, for example, the sample rate of the A/D converter 160 is 40 MHz and the number of outputs in the ultrasonic array outputs 210 is four (4). Therefore in this embodiment, the predetermined frequency operates at 4 outputs·40 MHz=160 MHz. Thus, each of the ultrasonic array outputs 210 is connected to the multiplexer output 230 for one-quarter (¼) of a cycle of the 40 MHz period. It should be appreciated that, in one embodiment, a single timing reference 180 is used to determine the predetermined frequency and maintains the timing sequencing, such as, for example, the predetermined frequency, between the time-domain multiplexer 114, the de-multiplexer 140 and the A/D converter 160. Additionally in this embodiment, since the timing reference 180 provides the timing sequence and/or predetermined frequency to the time-domain multiplexer 114, the de-multiplexer and the A/D converter 160, a timing cable 250 can also be housed in the probe connector 120.

As such, in the embodiment shown in FIG. 2, the time-domain multiplexer 114 converts four signals (S1–S4) from the ultrasonic array outputs 210 to one signal in the multiplexer output 230. Therefore, in the embodiment where the ultrasonic array 112 has about 500 ultrasonic array outputs 210, the 500 ultrasonic array outputs 210 can be reduced to 125 multiplexer outputs 230 wherein the probe comprises 125 time-domain multiplexers 114 each connected to 4 ultrasonic array outputs 210. Therefore, the number of ultrasonic array outputs 210 is reduced using the time-domain multiplexer 114 such that the probe connector 120 contains a few amount of cables. Thus, the probe connector 120 that has fewer cables is more flexible and easier to manipulate during ultrasonic imaging procedures.

In one embodiment, as further shown in FIGS. 2 and 3, the time-domain multiplexer 114 is connected to a de-multiplexer 140 of the ultrasonic data processing unit 130. As shown in FIG. 3, the de-multiplexer 140 is connected to the multiplexer output 230, and the de-multiplexer 140 includes a de-multiplexer switching element 310 that is connected to the timing reference 180. The de-multiplexer 140 also includes de-multiplexer output 330. It should be appreciated that, in one embodiment, the number of de-multiplexer output 330 is the same as the number of ultrasonic array outputs 210. In operation, the de-multiplexer 140 continually cycles through the de-multiplexer outputs 330 at the predetermined frequency connecting the multiplexer output 230 to each of the de-multiplexer outputs 330 for a predetermined time. As described hereinabove with reference to the time-domain multiplexer 114, the predetermined frequency that the de-multiplexer 140 operates is similarly determined by the sample rate of the A/D converter 160 multiplied by the number of outputs in the ultrasonic cable array 210. In the embodiment shown in FIGS. 2 and 3, for example, the sample rate of the A/D converter 160 is 40 MHz and the number of outputs in the ultrasonic array outputs 210 is four (4). Therefore in this embodiment, the predetermined frequency operates at 4 outputs·40 MHz=160 MHz. Thus, each of the de-multiplexer outputs 330 is connected to the multiplexer output 230 for one-quarter (¼) of a cycle of the 40 MHz period. It should also be appreciated that, in one embodiment, that a single timing reference 180 is used to determine the predetermined frequency and maintains the timing sequencing, such as, for example, the predetermined frequency, between the time-domain multiplexer 114, the de-multiplexer 140 and the A/D converter 160. Additionally in this embodiment, since the timing reference 180 provides the timing sequence and/or predetermined frequency to the time-domain multiplexer 114, the de-multiplexer 140 and the A/D converter 160, a timing cable 250 providing the at least one predetermined frequency can also be housed in the probe connector 120. Therefore, the signals (S1–S4) are converted to one signal by the time-domain multiplexer 114, and the one converted signal is provided to the de-multiplexer 140 via the multiplexer output 230. The de-multiplexer 140 re-converts the one converted signal back into four signals (S"1–S"4). Thus, the original ultrasonic signals (S1–S4) provided from the ultrasonic array outputs 210 are reconstructed as ultrasonic signal (S"1–S"4), and the reconstructed ultrasonic signals (S"1–S"4) are provided for further signal processing.

As described hereinabove, in one embodiment, the array connector 114 comprises a plurality of co-axial cables, and each co-axial cables includes a plurality of channels wherein each channel is connected to the ultrasonic array 112. Also in this embodiment, the time-domain multiplexer 114 comprises a plurality of time-domain multiplexers 114, and each of the plurality of time-domain multiplexers is connected to a respective one of the plurality of co-axial cables. As mentioned in one embodiment, the array connector 114 comprises about 500 ultrasonic array outputs 210. These ultrasonic array outputs 210 are bundled such that four (4) outputs and/or channels are provided to the time-domain multiplexer 114 that converts these signals into one multiplexer output signal 230. In this embodiment, the 500 ultrasonic output outputs 210 are reduced by 125 time-domain multiplexers 114 such that the multiplexer output 230 is included with 124 other multiplexer outputs 340 to comprise 125 multiplexer outputs 230, 340. The probe connector 120 houses the multiplexer output 230 and the other multiplexer outputs 340. In this embodiment, the multiplexer output 230 is connected to the de-multiplexer 140 and the other multiplexer outputs 340 are connected to additional de-multiplexers 320. In one embodiment, demultiplexers 140 with the number of additional de-multiplexers 320 comprise about 125 de-multiplexers 140, 320. The de-multiplexers 140, 320 reconstruct the ultrasonic data into 500 ultrasonic data outputs, and using the timing sequences and/or the predetermined frequency from the timing reference 180, the de-multiplexers 140, 340 are able to reconstruct the ultrasonic data from each of the 500 ultrasonic array outputs 210.

As shown in FIGS. 1–3, after the de-multiplexer 140 reconstructs the ultrasonic data, the de-multiplexer output 330 is connected to a time gain control (TGC) amplifier 150 that amplifies the signal containing the ultrasonic data. The amplified ultrasonic data is supplied to an A/D converter 160 that converts the ultrasonic data into digital ultrasonic data. It should be appreciated that, in one embodiment, that a TGC amplifier 150 and an A/D converter 160 are used for each de-multiplexer 140. As such, in the embodiment with 125 de-multiplexers 140, 320, there are 125 TGC amplifiers 150 and an A/D converters 160. Once the A/D converter 160 has converted the ultrasonic data to digital form, the digital ultrasonic data is provided to image processing electronics 170 that further process the digital ultrasonic data. The processed digital ultrasonic data is provided to the processing unit output 190 where the processed digital ultrasonic data can be used to produce an ultrasonic image.

Figure 4:
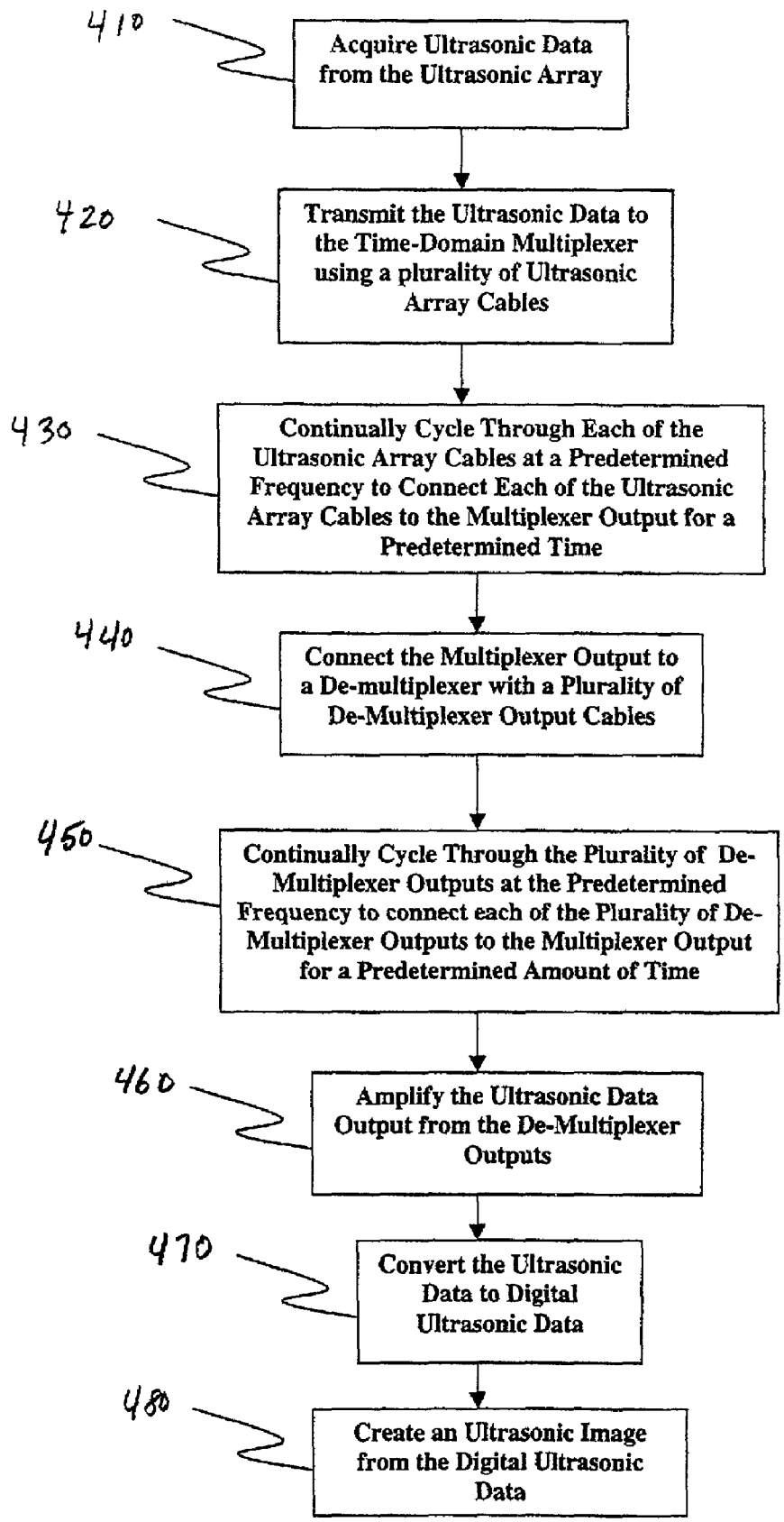
FIG. 4 is a flow diagram of one exemplary embodiment of a method for time-domain communication in an ultrasonic imaging system.

In FIG. 4, a method for time-domain communication in an ultrasonic imaging system includes acquiring ultrasonic data from an ultrasonic array 112 (step 410). The ultrasonic data is transmitted via a plurality of ultrasonic array outputs 210 to a time-domain multiplexer 114 (step 420). The time-domain multiplexer 114 continually cycles through each of the ultrasonic array outputs 210 at a predetermined frequency to connect each of the ultrasonic array outputs 210 to the multiplexer output 230 for a predetermined amount of time (step 430). Thus, the ultrasonic data from each of the plurality of ultrasonic array outputs 210 is converted to a ultrasonic data signal on the multiplexer output 230. The multiplexer output 230 is connected a de-multiplexer having a plurality of de-multiplexer outputs 330 (step 440). The de-multiplexer 140 continually cycles through the plurality of de-multiplexer outputs 330 at a predetermined frequency to connect each of the de-multiplexer outputs 330 to the multiplexer output 230 for a predetermined amount of time (step 450). Thus, ultrasonic data signal from the multiplexer output 230 is reconstructed to form the ultrasonic data in the ultrasonic array outputs 210. The reconstructed ultrasonic data output from the de-multiplexer outputs 330 is amplified using a TGC amplifier (step 460). The amplified ultrasonic data is converted to digital ultrasonic data using an A/D converter 160 (step 470). The digital ultrasonic data is used to create an ultrasonic image (step 480).

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A time-domain communication system for use in an ultrasonic imaging system, the time-domain communication system comprising:

an ultrasonic array having a plurality of ultrasonic array outputs;

a time-domain multiplexer having an input connected to each of the plurality of ultrasonic array outputs and having a multiplexer output, the time-domain multiplexer continually cycles through each of the plurality of ultrasonic array outputs at a predetermined frequency connecting each of the plurality of ultrasonic array outputs to the multiplexer output for a predetermined amount of time, wherein the plurality of ultrasonic array outputs comprises a first number of outputs and the multiplexer output comprises a second number of outputs, the first number of outputs being greater than the second number of outputs;

a de-multiplexer having an input connected to the multiplexer output, the de-multiplexer having a plurality of de-multiplexer outputs, the de-multiplexer continually cycles through each of the plurality of de-multiplexer outputs at the predetermined frequency connecting each of the plurality of de-multiplexer outputs to the multiplexer output for the predetermined amount of time, wherein the plurality of de-multiplexer outputs comprises a third number of outputs, the third number of outputs being greater than the second number of outputs;

a time gain control amplifier connected to each of the plurality of de-multiplexer outputs and amplifying each respective signal in each of the plurality of de-multiplexer outputs;

an analog to digital converter connected to the time gain control amplifier, wherein each respective signal in each of the plurality of de-multiplexer outputs is converted to a digital signal at a sample frequency rate; and a timing reference connected to the time-domain multiplexer, the de-multiplexer and the analog to digital converter for providing a single timing reference to determine at least the predetermined frequency and the sample frequency rate.

2. The system of claim 1, wherein the analog to digital converter is connected to image processing electronics for generating an ultrasonic image.

3. The system of claim 1, wherein the ultrasonic array comprises a plurality of cables bundles wherein each of the plurality of cable bundles includes at least one ultrasonic array output of the plurality of ultrasonic array outputs.

4. The system of claim 3, wherein the time-domain multiplexer comprises a plurality of time-domain multiplexers and the de-multiplexer comprising a plurality of de-multiplexers, each of the plurality of time-domain multiplexers having a multiplexer output, wherein each of the plurality of time domain multiplexers are connected to a respective one of the plurality of cable bundles and the multiplexer output of each of the plurality of time-domain multiplexer being connected to a respective one of the plurality of de-multiplexers.

5. The system of claim 1, wherein the predetermined frequency comprises the sample frequency rate times the first number of outputs.

6. A time-domain communication system for use in an ultrasonic imaging system, the communications system comprising:

an ultrasonic probe, comprising:

an ultrasonic array having a plurality of ultrasonic array outputs; and a time-domain multiplexer having an input connected to each of the plurality of ultrasonic array outputs and having a multiplexer output wherein the time-domain multiplexer continually cycles through each of the plurality of ultrasonic array outputs at a predetermined frequency connecting each of the plurality of ultrasonic array outputs to the multiplexer output for a predetermined amount of time;

an ultrasonic data processing unit, comprising:

a de-multiplexer connected to the multiplexer output, the de-multiplexer having a plurality of de-multiplexer outputs wherein the de-multiplexer continually cycles through each of the plurality of de-multiplexer outputs at the predetermined frequency connecting each of the plurality of de-multiplexer outputs to the multiplexer output for the predetermined amount of time;

a timing reference connected to the time-domain multiplexer and the de-multiplexer for providing a single timing reference to determine at least the predetermined frequency.

7. The system of claim 6, wherein the plurality of ultrasonic array outputs comprises a first number of outputs and the multiplexer output comprises a second number of outputs, the first number of outputs being greater than the second number of outputs.

8. The system of claim 7, wherein the plurality of de-multiplexer outputs comprises a third number of outputs, the third number of outputs being greater than the second number of outputs.

9. The system of claim 6, further comprising a time gain control amplifier connected to each of the plurality of de-multiplexer outputs and amplifying each respective signal in each of the plurality of de-multiplexer outputs.

10. The system of claim 9, further comprising an analog to digital converter connected to the time gain control amplifier and the timing reference, wherein each respective signal in each of the plurality of de-multiplexer outputs is converted to a digital signal at a sample frequency rate.

11. The system of claim 10, wherein the analog to digital converter is connected to image processing electronics for generating an ultrasonic image.

12. The system of claim 6, wherein the ultrasonic array comprises a plurality of cables bundles, wherein each of the plurality of cable bundles includes at least one of the plurality of ultrasonic array outputs.

13. The system of claim 12, wherein the time-domain multiplexer comprises a plurality of time-domain multiplexers and the de-multiplexer comprising a plurality of de-multiplexers, each of the plurality of time-domain multiplexers having a multiplexer output, wherein each of the plurality of time domain multiplexers is connected to a respective one of the plurality of cable bundles and the multiplexer output of each of the plurality of time-domain multiplexer being connected to a respective one of the plurality of de-multiplexers.

14. A method for time-domain communication in an ultrasonic imaging system, the method comprising the steps of:
  acquiring ultrasonic data from an ultrasonic array;
  transmitting the ultrasonic data via a plurality ultrasonic array outputs to a time-domain multiplexer having an input connected to each of the plurality of ultrasonic array outputs, the plurality of ultrasonic array outputs comprising a first number of outputs;
  continually cycling through each of the plurality of ultrasonic array outputs at a predetermined frequency to connect and transmit the ultrasonic data from the plurality of ultrasonic array outputs to at least one multiplexer output for a predetermined amount of time, the at least one multiplexer output having a second number of outputs, wherein the first number of outputs is greater a second number of outputs;
  connecting the at least one multiplexer output to a de-multiplexer having a plurality of de-multiplexer outputs, the plurality of de-multiplexer outputs comprising a third number of outputs, wherein the third number of outputs is greater than the second number of outputs;
  continually cycling through the plurality of do-multiplexer outputs at the predetermined frequency to connect each of the plurality of de-multiplexer outputs to the at least one multiplexer output and to transmit the ultrasonic data from the multiplexer output to the plurality of de-multiplexer outputs;
  amplifying the ultrasonic data in the plurality of de-multiplexer outputs;
  converting the amplified ultrasonic data to digital ultrasonic data at a sampling frequency rate; and
  creating an ultrasonic image from the digital ultrasonic signal.

15. The method of claim 14, wherein the predetermined frequency comprises the sample frequency rate multiplied by the first number of outputs.

16. The method of claim 14, wherein the predetermined frequency and the sample frequency rate are provided by a timing reference.

17. A method for time-domain communication in an ultrasonic imaging system, the method comprising the steps of:
  acquiring ultrasonic data from an ultrasonic array;
  transmitting the ultrasonic data via a plurality ultrasonic array outputs to a time-domain multiplexer having an input connected to each of the plurality of ultrasonic array outputs, wherein the plurality of ultrasonic array outputs comprising a first number of outputs;
  continually cycling through each of the plurality of ultrasonic array outputs at a predetermined frequency to connect and transmit the ultrasonic data from each of the plurality of ultrasonic array outputs to at least one multiplexer output for a predetermined amount of time;
  connecting the at least one multiplexer output to a de-multiplexer having a plurality of de-multiplexer outputs; and
  continually cycling through the plurality of de-multiplexer outputs at the predetermined frequency to connect each of the plurality of de-multiplexer outputs to the at least one multiplexer output and to transmit the ultrasonic data from the multiplexer output to the plurality of de-multiplexer outputs.

18. The method of claim 17, wherein the at least one multiplexer output has a second number of outputs and the first number of outputs being greater a second number of outputs.

19. The method of claim 18, wherein the plurality of de-multiplexer outputs comprises a third number of outputs and the third number of outputs is greater than the second number of outputs.

20. The method of claim 17, further comprising the step of amplifying the ultrasonic data output from the plurality of de-multiplexer outputs.

21. The method of claim 17, further comprising the step of converting the ultrasonic data to digital ultrasonic data at a sampling frequency rate.

22. The method of claim 18, further comprising the step of creating an ultrasonic image from the digital ultrasonic signal.

23. The method of claim 18, wherein the predetermined frequency comprises the sampling frequency rate multiplied by the first number of outputs.

24. The method of claim 18, wherein the predetermined frequency and the sampling frequency rate are provided by a timing reference.

* * * * *

UNITED STATES PATENT AND TRADEMARK OFFICE
CERTIFICATE OF CORRECTION

PATENT NO. : 6,967,975 B2  Page 1 of 1
APPLICATION NO. : 09/681617
DATED : November 22, 2005
INVENTOR(S) : Nick Andrew Van Stralen It is certified that error appears in the above-identified patent and that said Letters Patent is hereby corrected as shown below:

Title Page, Item (75) Inventors:
The spelling of the inventor "Nick Andrew Van Stalen" is incorrect. The correct spelling should be --Nick Andrew Van Stralen--.

Signed and Sealed this

Eighteenth Day of August, 2009

David J. Kappos
*Director of the United States Patent and Trademark Office*